United States Patent [19]
Langguth et al.

[11] Patent Number: 5,457,959
[45] Date of Patent: Oct. 17, 1995

[54] PRESSURE-OPERATED POSITIONING TOOL OR GRIPPING AND CLAMPING TOOL AND PROCESS FOR OPERATING SAME

[75] Inventors: Volker Langguth, St. Georgen; Reinhard Klein; Wolfgang Bauspiess, both of Villingen; Wolf-Dieter Goedecke, St. Georgen, all of Germany

[73] Assignee: Mannesmann Aktiengesellschaft, Dusseldorf, Germany

[21] Appl. No.: 251,518

[22] Filed: May 31, 1994

[30] Foreign Application Priority Data

Jun. 1, 1993 [DE] Germany .................. 43 19 022.7

[51] Int. Cl.$^6$ .................. F16D 31/00; F15B 13/16
[52] U.S. Cl. .................. 60/327; 60/368; 91/361; 91/459
[58] Field of Search .................. 91/459, 361, 363 R, 91/DIG. 1; 60/327, 328, 463, 368, 390

[56] References Cited

U.S. PATENT DOCUMENTS

| | | | |
|---|---|---|---|
| 3,542,274 | 11/1970 | Miller | 60/368 X |
| 4,991,491 | 2/1991 | Neumann | 91/459 X |
| 5,012,722 | 5/1991 | McCormick | 91/459 X |
| 5,111,658 | 5/1992 | Strenzke et al. | 60/327 |
| 5,343,994 | 9/1994 | Kyrtsos | 91/361 X |

FOREIGN PATENT DOCUMENTS 0192603  11/1982  Japan .................. 91/361

Primary Examiner—Edward K. Look
Assistant Examiner—Hoang Nguyen
Attorney, Agent, or Firm—Cohen, Pontani, Lieberman, Pavane

[57] ABSTRACT

Disclosed is a process for operating a pressure-operated positioning tool or gripping and clamping tool and a tool itself, in which the position of at least one adjusting member is determined and the valve-actuated supply of pressure medium to the adjusting member is regulated depending on position. To take into account the elasticity of the contact elements in the target position and to exert influence after the target position has been reached in a process and in a tool of the generic type, the regulating of the valve-actuated supply of pressure medium is not only effected in a position-dependent manner, but also takes into account the pressure of the pressure medium.

6 Claims, 3 Drawing Sheets

5,457,959

PRESSURE-OPERATED POSITIONING TOOL OR GRIPPING AND CLAMPING TOOL AND PROCESS FOR OPERATING SAME

BACKGROUND OF THE INVENTION

1. Field of the Invention

The invention relates to a process for operating a pressure-operated positioning or gripping and clamping tool and to a pressure-operated positioning tool or gripping and clamping tool. More particularly, the invention relates to such a process and tool wherein the position of at least one adjusting member is determined and the valve-actuated supply of pressure medium to the adjusting member is regulated depending on position.

2. Description of the Prior Art

A great many pressure-operated positioning tools or gripping and clamping tools are known from the prior art. In such devices, the position of an adjusting member is determined and the supply of pressure medium to the adjusting member is regulated by valves depending on the position. In known processes and devices, for a quick, time-saving adjustment of the tool, the adjusting member is often allowed to move in a sudden or jerking manner into the end position, in which the residual kinetic energy must then be absorbed. This leads to increased wear. Such jerking is reduced when the approach to the target position is regulated, but this results in a longer positioning time.

In specific applications, e.g. when actuating electrode holders or welding tongs on welding robots, an effect is produced whereby the welding electrodes give or yield to increased application of force in the target position. In known devices and processes for actuating welding tongs in robots, the elasticity of the contact elements is not taken into account when approaching the target position.

SUMMARY OF THE INVENTION

An object of the present invention is to move a pressure-operated tool into position in a number of phases which account for a number of parameters.

It is another object of the present invention to take into account the elasticity of the contact elements in the target position and to exert influence once the target position has been reached, particularly in actuating welding tongs in welding robots.

The present invention provides a process for operating a pressure-operated tool, comprising determining the position of at least one adjusting member, determining the pressure of a pressure medium, operating the adjusting member, regulating the valve-actuated supply of pressure medium to the adjusting member depending on the position of the adjusting member and pressure of the pressure medium. An apparatus for performing the process also is part of the present invention.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
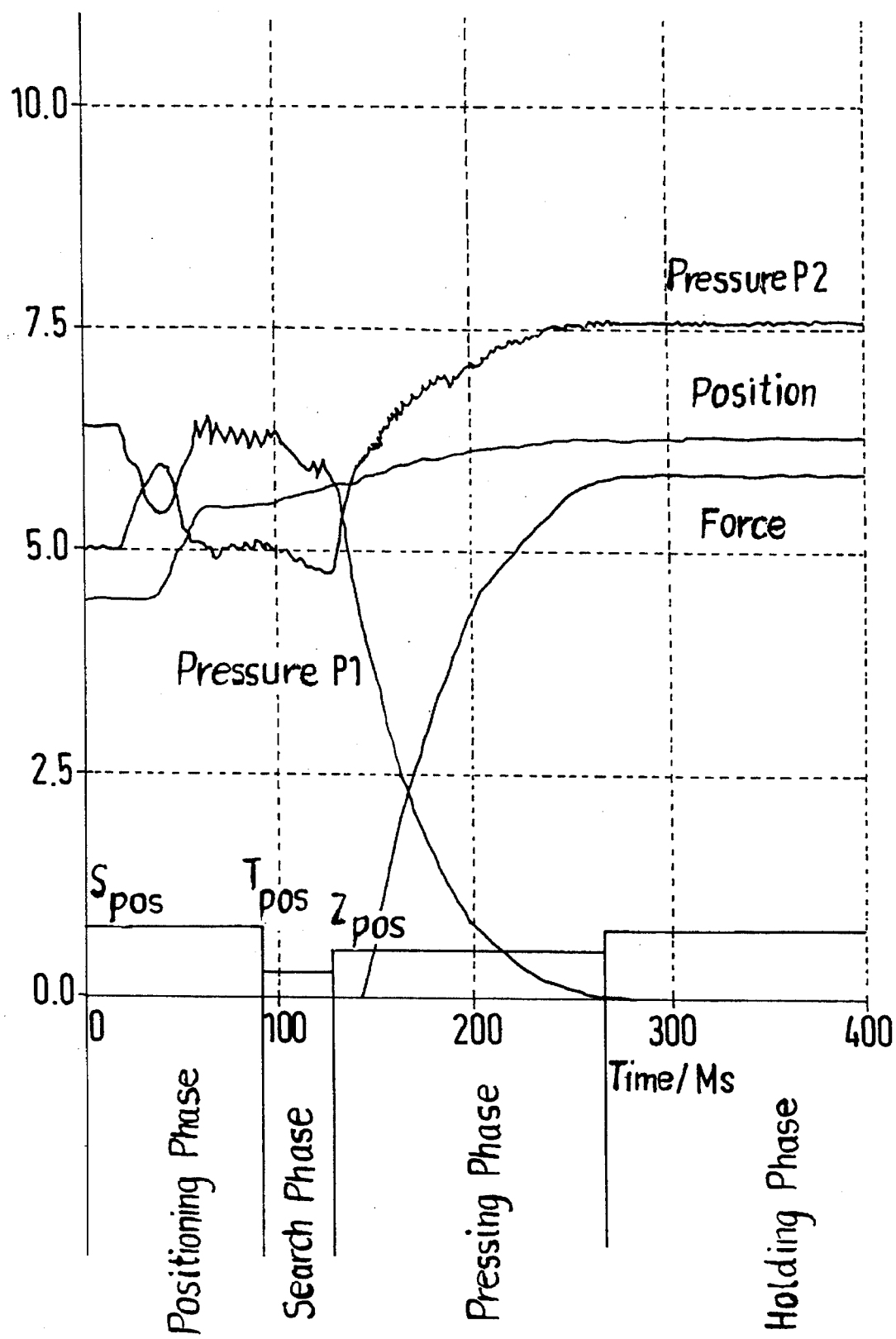
FIG. 1 shows the position as a function of time of the present invention to illustrate the process.

With respect to the process, the solution according to the invention consists in that the regulating of the valve-actuated supply of pressure medium is not only effected in a position-dependent manner, but also takes into account the pressure of the pressure medium. The time and position at which regulation is effected in a pressure-dependent or position-dependent manner is determined by a zonewise division. "Position-dependent" regulation means that the supply of pressure medium is regulated depending on the position value determined by a path sensing means or position sensing means.

Therefore, in a further development of the process, once the adjusting path provided for a positioning task has been determined, this adjusting path is divided into zones. In so doing, a differentiated evaluation of the provided adjusting path is already effected, subsequent regulation being effected according to zone. In this way, the positioning task is carried out in an optimal manner with respect to time.

In another construction, the adjusting path is divided into at least two zones. The first zone extends from a starting position $S_{pos}$ to an optionally selected tolerance limit $T_{pos}$ in the vicinity of a target position $Z_{pos}$; the second zone extends from the tolerance limit $T_{pos}$ to the target zone $Z_{pos}$. The supply of pressure medium to the adjusting member is regulated in a substantially position-dependent manner in the first zone and in a substantially pressure-dependent manner in the second zone. Consequently, the purpose of the first zone is essentially to traverse a high-speed path in order to reach the target position as quickly as possible. Shortly before the target position is reached, additional regulation is effected only in a pressure-dependent manner. This regulation can proceed in a braked manner. However, in another development of the invention, this second zone is subdivided into two partial zones, the supply of pressure medium being regulated in a substantially position-dependent manner in the first partial zone in the region of $T_{pos}$ and only in a pressure-dependent manner in the second partial zone until $Z_{pos}$. The storage of parameters for the zoning and the position values and pressure values can be effected in an adaptive manner for repetitive positioning tasks. In another development, arrival in the target position is followed by a holding phase in which the supply of pressure medium is regulated in a time-dependent and/or event-dependent manner. The jolt occurring when the target position is reached is drastically reduced owing to the fact that the supply of pressure medium in the last phase in the region of the target position is regulated in an exclusively pressure-dependent manner.

A problem with respect to electrode actuation in welding robots consists in that the electrodes, including the holder, exhibit a spring-like bending when the "contact position" is reached due to considerations relating to apparatus and geometry. However, depending on the articulation of the welding tong elements, the position sensing means records a change in position at the adjusting member. As a result, in conventional regulating methods and devices, the adjusting member would continue to be acted upon by an adjusting quantity or controlling variable. In known processes and devices, this would continue until the cessation of mechanical bending or yielding in the individual elements. However, wear resulting from such behavior is prevented in the solution according to the invention. Further, precisely this "elastic" zone cannot be exploited for technical purposes in known devices, e.g., for regulating the contact pressure during the welding process.

As a result of the pressure-dependent regulating, in particular in the last phase of the positioning path, the point in the welding process at which the electrodes of the welding robot contact the workpiece, for example, can be detected in a definite manner by evaluating the pressure curve. Since the process is adaptive, the adjusting path is determined and the target position is detected after one run-through of the positioning task. Thereafter, it is possible to distinguish in a concrete manner between arrival in the target position, that is, impact of the electrodes, and a bending of the individual holding elements. This leads to the further advantage that precisely in this phase after the impact of the electrodes, the elastic phase can be sensed and made use of, e.g., to regulate the contact pressure of the electrodes. The holding phase, which is described with reference to a further development, can then be regulated in a time-dependent and/or event-dependent manner. In so doing, it is likewise advantageous that a high local resolution of the position sensing device can be dispensed with and the position sensing device can accordingly have a simpler design. The reason for this will be explained in the following.

In the region of the actual high-speed path, i.e., the region of the rough positioning into the end position, the position sensing means must sense a large distance. In the second phase, a position sensing device such as that used in known processes and devices would have to have a local resolution which is high enough so that the small changes in position in the region near the target position or possibly in the elasticity region of the contact elements, as the case may be, are sufficiently precise. As already mentioned, the path sensing systems or position sensing systems must therefore be of high quality and are accordingly expensive. In contrast, the present invention has the advantage that the position sensing system is used essentially only for traversing the high-speed path and possibly also for the search phase, so that there is no need for a high local resolution, and that further regulation in the region of the target position or in the region of elasticity is effected in a pressure-dependent manner. This means that the position sensing system can have a correspondingly simple construction and the positioning in the elastic region is extremely sensitive owing to the pressure-dependent positioning. The arrangement of pressure measuring elements poses no problem and can be effected in a simple manner by integrating in valves or in the corresponding pressure lines.

With respect to a pressure-operated positioning tool or gripping and clamping tool having at least one valve-controlled pressure-operated adjusting member and means for sensing and regulating the position of the adjusting member, means are provided according to the invention for sensing the pressure of the pressure medium in the region where pressure medium is supplied to the adjusting member. These means can be arranged optionally in the pressure-medium feed line system or in the portion of the valves on the side of the operating line. This provides the possibility of a differentiated regulation which distinguishes between the two states: a) change in position recorded because the target position has not yet been reached; b) target position reached, change in position due to elastic resilience of the individual elements.

The invention is particularly advantageous for mechanical actuation of electrodes in welding robots. Further, the point of impact of the electrodes can be "learned" after one pass, so that a continual "crashing" in the target position is prevented in subsequent continuous operation. Overall, the entire regulation is also effected in an optimal manner with respect to time.

The invention is shown in the drawings (FIGS. 1–3) and described in more detail in the following.

FIG. 1 illustrates the process according to the invention in which the parameters, pressure 1 and pressure 2, are plotted in relation to position and force. The time divisions are plotted on the abscissa, this division being effected in the present example in four phases or zones:
1. positioning phase
2. search phase
3. pressing phase
4. holding phase.

The corresponding units are plotted arbitrarily on the ordinate. The pressure-operated adjusting member is acted upon by pressure in the positioning phase which is identified essentially as a high-speed path. For example, a work cylinder constructed according to FIG. 2 to have a piston 1 and a piston rod 3 is used for this purpose. The piston divides the cylinder interior into two pressure spaces. The cylinder is extended in one direction by increasing one of the pressures and reducing the other pressure. Therefore, the pressure curves of pressure 1 and pressure 2 extend in opposite directions. In the positioning phase, the pressure level in cylinder space Z1 is reduced, whereas the pressure in cylinder space Z2 increases correspondingly to move in the other direction. The division into the four zones shown in the drawing is effected naturally after a first run-through and is fixed for all following run-throughs. In the event of a change in the positioning task or in the marginal conditions, the zones may also be redefined, since the system is designed to be adaptive. When the adjusting member reaches the limit of the positioning phase, it passes into a second phase, the so-called search phase, in the present example. In this search phase, regulation is effected depending on position and/or speed, but only by small local or positional changes. This can be seen by comparing the position curve shown in FIG. 1.

In the positioning phase, there is a steep climb, that is, a substantial change in position, which is at first decelerated and then passes into the search phase. The braking during the transition from the positioning phase to the search phase is also discernable in the application of pressure in the pressure curves of pressure P1 and pressure P2. For example, it will be seen here that the pressure P2 regulated for extending the cylinder in the positioning phase drops suddenly in the search phase and the pressure P1 which was previously reduced is now increased for the purpose of braking. When the adjusting member passes from the search phase to the pressing phase, the target position, i.e., the contact position, is achieved. Regulation is now effected in an exclusively pressure-dependent manner. Position sensing no longer takes place. It will be seen particularly clearly that the position curve in the pressing phase has only a small gradient, whereas the pressure curves of pressure P1 and pressure P2 have large gradients. The correspondingly large pressure gradients in comparison to the relatively small position gradients clearly show that the pressure is taken into account in a substantially more sensitive manner than a position sensing in this region. In this pressing phase, the elasticity of the contact elements is taken into account. It can be seen in the transition to the holding phase that the pressure gradients of pressure P1 and pressure P2 approach zero and the elasticity region is accordingly exhausted. When using the process for actuation of electrodes in welding robots, the welding process may be influenced in this holding phase. This welding process can then be regulated via pressure either in a time-dependent or event-dependent manner. For example, it is possible to fix the duration of welding or to influence the individual welding phases in the welding process. The electrodes first contact the workpiece during the welding process.

The electrodes and the workpiece remain in the heating state, i.e. in the stationary state, until the moment of ignition and also somewhat longer. If the melting point is reached quickly, the electrode and workpiece fuse in the contact area so that the electrodes no longer encounter fixed resistance. In the process according to the present invention, this transition into the liquid phase can be detected again by a change in position so that the contact pressure of the electrodes can be changed. This leads to a considerable improvement in the quality of the weld connections. When it is said above that ". . . regulation is effected in the holding phase in a time-dependent and/or event-dependent manner" this refers precisely to a process of this kind.

Figure 2:
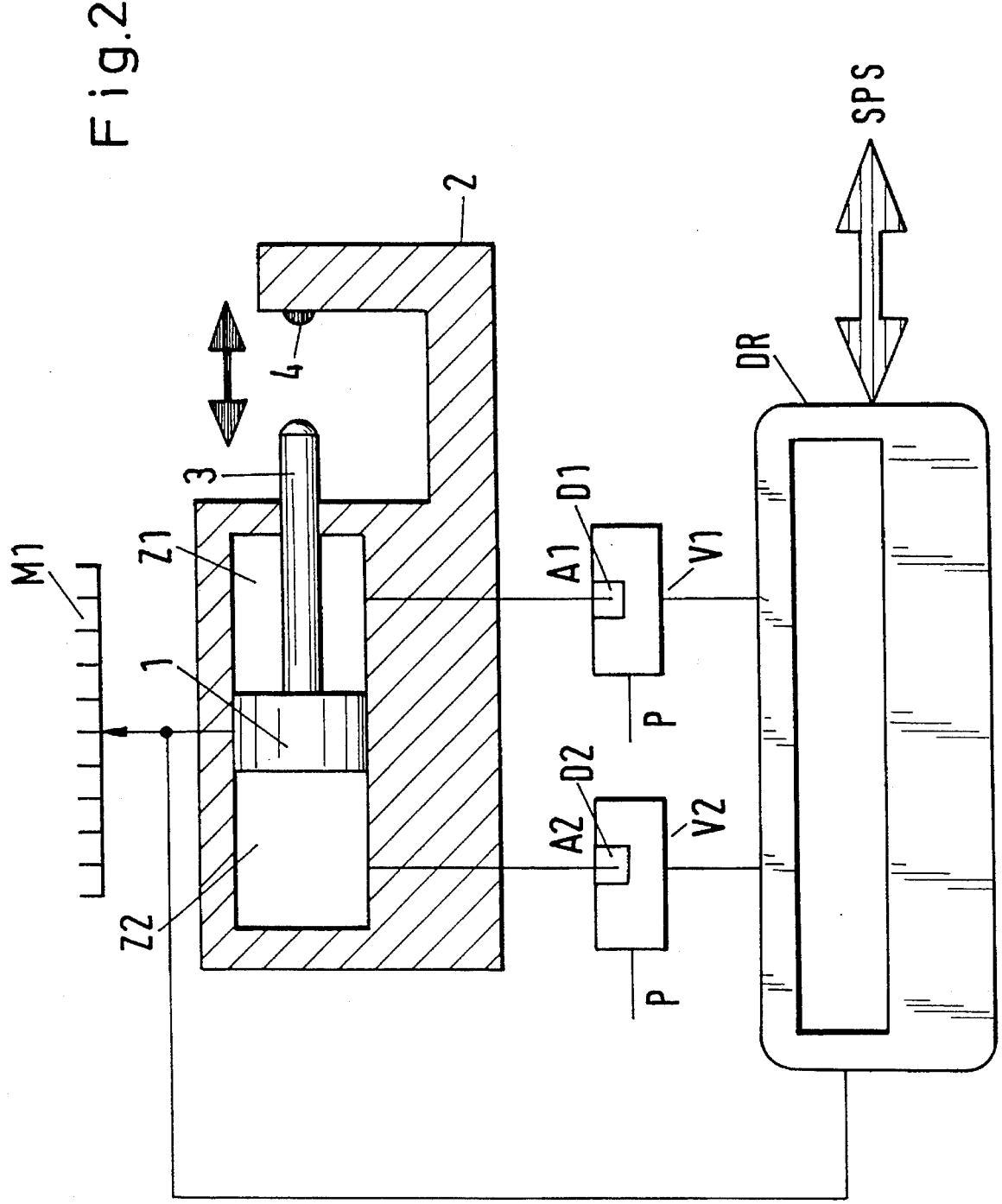
FIG. 2 is a schematic view of the adjusting member and control elements, including the regulating means.

FIG. 2 shows a construction in which the device and the process according to the invention are used by way of example. The figure shows a work cylinder with a piston 1 and a piston rod 3 which is guided in the work cylinder and movably divides the cylinder space into pressure spaces Z1 and Z2. The piston extends the piston rod 3 to the contact point 4 when pressure is applied. This is a simplified illustration of an actuation of electrodes in welding robots. The workpieces to be welded are introduced between the tip of the piston rod 3 and the contact point 4. In order for the piston to move the piston rod 3 and electrode into the contact position, the cylinder space Z2 is acted upon by pressure via the work line A2 and the valve V2, i.e. the cylinder space Z2 is aerated. At this time, in the high-speed path, the pressure space Z1 is deaerated to a greater or lesser extent. The piston 1 is braked at the conclusion of the positioning phase in that the pressure space Z1 is now acted upon by pressure, i.e., aerated, via the valve V1. The piston position is determined via a position sensing system or measuring system M1 which is schematically shown in FIG. 2.

In the transition from the search phase to the subsequent pressing phase and holding phase, there is also a transition from position dependence via the position sensing system M1 to pressure dependence via the pressure sensors D1, D2 in valves V1 and V2. Valves V1 and V2 are pressure servo valves with integrated pressure sensors. In the pressing phase, there is a small change in position due to the elasticity of the contact elements 2 as mentioned above. This change in position is monitored according to the process via the integrated pressure sensors. The pressure values are monitored and the servo valves are controlled via a digital regulator DR which corresponds to a stored program control SPS. The pressure values of valves V1 and V2 and the position values from the measuring system M1 are fed to the digital regulator DR. The output of the corresponding control signals for the servo valves is effected according to the process. The pressure medium input of valves V1 and V2 is designated by P and the two work lines are designated by A1 and A2.

Figure 3:
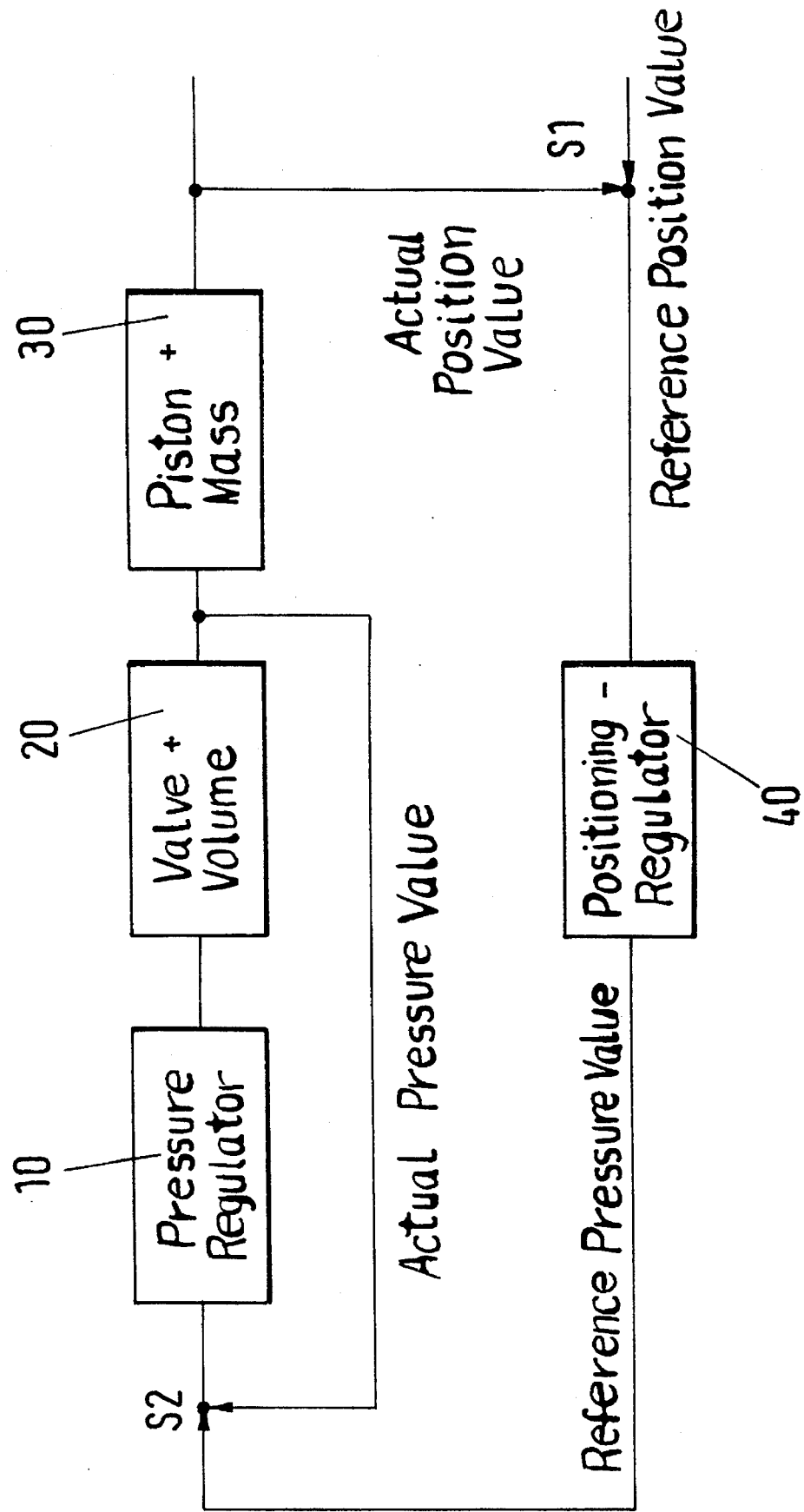
FIG. 3 shows the structure of the regulating circuit.

FIG. 3 shows an overview of the structure of the regulating circuit for the present invention. The drawing shows the pressure regulator 10 representing the valve volume and the cylinder volume to be controlled, a black box, designated by 20, and another black box 30 taking into account the position of the piston and the mass. All values are compiled in the positioning regulator 40. According to a preset reference position value, control techniques are employed to superpose an actual position value on the reference position value at the summation point S1 so that a differential is supplied to the positioning regulator 40. This positioning regulator 40 determines a reference pressure value which is applied to a second summation point S2 by control techniques. The actual pressure value at the valves is superposed on the reference pressure value at this summation point S2 by control techniques and the results are fed to the pressure regulator 10.

All of the inventive features and their realization with respect to the process and device, considered in their entirety, lead to considerable advantages when used for spot welding systems with welding robots. These advantages include a minimizing of the opening and closing times, minimizing of electrode wear via a controlled closing process with gentle placement of the electrodes, an increase in the weld quality by programming the pressing force in the manner mentioned above, an increase in safety due to the monitoring of burning and breakage of electrodes, and a reduction in operating costs as the result of reduced consumption of air due to the variable adjustment of the opening lift.

The invention is not limited by the embodiments described above which are presented as examples only but can be modified in various ways within the scope of protection defined by the appended patent claims.

We claim:

1. A process for operating a pressure-operated tool, comprising determining a position of at least one adjusting member, determining a pressure of a pressure medium, operating the adjusting member, and regulating a valve-actuated supply of pressure medium to the adjusting member based on the position of the adjusting member and pressure of the pressure medium, the regulating including sensing an adjusting path for positioning the adjusting member and dividing the adjusting path into different zones, the adjusting path being divided into at least two zones, wherein the first zone, as a positioning phase, extends from a starting position to an optionally selected tolerance limit near a target position and the second zone, as a search phase, extends from the tolerance limit to the target position.

2. The process according to claim 1, wherein the supply of pressure medium to the adjusting member is regulated in the first zone substantially on the position of the adjusting member and in the second zone substantially dependent on the pressure of the pressure medium.

3. The process according to claim 1, wherein the second zone is followed by a pressing zone in which regulation is effected exclusively dependent on the pressure of the pressure medium.

4. The process according to claim 2, wherein parameters for the zoning and for the position values and pressure values are stored in an adaptive manner for repetitive positioning tasks.

5. The process according to claim 4, wherein a holding phase is effected after the target position is reached and after completion of the pressing phase, during the holding phase the tool operates on a workpiece in at least one step and the supply of pressure medium is regulated based on a regulating parameter selected from time duration of the work and step of work being performed.

6. The process according to claim 5, wherein the tool comprises electrodes for welding and the electrodes contact the workpiece and the workpiece is welded during the holding phase.

* * * * *